United States Patent [19]
Hartwig et al.

[11] 3,849,269
[45] Nov. 19, 1974

[54] PROCESSING ORES CONTAINING NICKEL AND COPPER OXIDES

[75] Inventors: Jürgen Hartwig, Essen-Steele; Ulrich Scheffler; Klaus-Herbert Ulrich, both of Essen, all of Germany

[73] Assignee: Fried Krupp Gesellschaft mit beschrankter Haftung, Essen, Germany

[22] Filed: Sept. 18, 1973

[21] Appl. No.: 398,405

[30] Foreign Application Priority Data
Sept. 21, 1972  Germany.......................... 2246413

[52] U.S. Cl............. 204/107, 204/105 M, 204/113, 75/101 R, 75/101 BE, 75/104, 75/108, 75/111, 75/114, 75/119, 75/121, 75/140, 75/633

[51] Int. Cl......... C22d 1/16, C22d 1/14, C22b 3/00

[58] Field of Search............... 204/105 M, 107, 113; 75/104, 108, 119, 117, 111, 114, 101 BE, 101 R, 633, 140, 121

[56] References Cited
UNITED STATES PATENTS

| | | | |
|---|---|---|---|
| 2,775,517 | 12/1956 | Mancke | 75/119 |
| 3,100,700 | 8/1963 | Hills | 75/101 R |
| 3,149,961 | 9/1964 | Moklebust | 75/101 R |
| 3,169,856 | 2/1965 | Mero | 75/121 |
| 3,728,105 | 4/1973 | Skarbo | 75/119 |
| 3,753,686 | 8/1973 | Wilder et al. | 75/119 |
| 3,788,841 | 1/1974 | Agarwal et al. | 75/119 |

*Primary Examiner*—R. L. Andrews
*Attorney, Agent, or Firm*—Spencer & Kaye

[57] ABSTRACT

Ores containing nickel and copper oxides are initially reduced and then leached with aqueous ferric chloride. The resulting solution is oxidized to precipitate ferric hydroxide therefrom and is thereafter separated into its components from which cobalt and nickel are recovered by electrolysis. Alternatively, the resulting solution is oxidized in the presence of flaking agents which assist the nickel, copper and cobalt in adhering to precipitated ferric hydroxide, from which they are leached with an ammonium carbonate solution and separated by ion exchange or solvent extraction.

8 Claims, 2 Drawing Figures

PROCESSING ORES CONTAINING NICKEL AND COPPER OXIDES

BACKGROUND OF THE INVENTION

Since valuable substances, such as nickel and copper, are often present in a crystal bond with iron in ores containing nickel and copper oxides, processing these valuable substances presents material difficulties. Initial reduction of high-quality ore, which contains cobalt in addition to iron and nickel, with carbon or hydrogen, thus selectively reducing the valuable components to their respective free metals, e.g., nickel and cobalt, fails to separate non-noble and undesirable side elements, such as iron and the dross components, which remain in the form of oxides. Metallization, however, does destroy the crystal bond, predominantly with iron oxides, of the valuable substances and thus makes them accessible to selective solvent extraction, effected by chemical treatment with an ammonium carbonate solution in an oxidizing atmosphere. During the chemical treatment oxides are reformed from components of the valuable substances which, now freely accessible, form soluble amino compounds which are selectively precipitated during further processing.

This process, however, is not suitable when the ore contains large quantities of undesirable minerals having oxides which also form soluble amino complexes. Such is the case, for example, when iron ore contains manganese. Formed amino complexes, which are often unstable, impede further processing of the thus-obtained solution.

SUMMARY OF THE INVENTION

Oxidic ore containing nickel values as well as copper and/or cobalt values is initially reduced and then leached with aqueous ferric chloride, with which metallized nickel, copper and cobalt, as well as manganese, react to form stable and soluble chlorides. The reaction, which takes place according to the equation:

$$2 FeCl_3 + Ni(Cu, Co) \rightarrow Ni(Cu, Co)Cl_2 + 2 FeCl_2,$$

assures a relatively favorable iron/(valuable component) ratio in the solution even at normal pressure and temperature. The solution is subsequently further processed by known techniques wherein resulting ferrous chloride is transformed to ferric chloride and ferric hydroxide by oxidation with, e.g., air.

Thus-formed ferric chloride is then available for further leaching, and the hydroxide precipitate can be dumped as non-polluting waste or can be used for producing iron after being roasted.

An object of this invention is to provide a practical and simple way to recover cobalt, nickel and copper from oxide-containing ores. A further object is to avoid the formation of amino complexes of undesirable minerals, which are also present in the ores. Additional objects are apparent from the detailed description which follows.

BRIEF DESCRIPTION OF THE DRAWINGS

The two figures provide flow diagrams of alternative embodiments of the subject invention.

DESCRIPTION OF THE PREFERRED EMBODIMENTS

Figure 1:
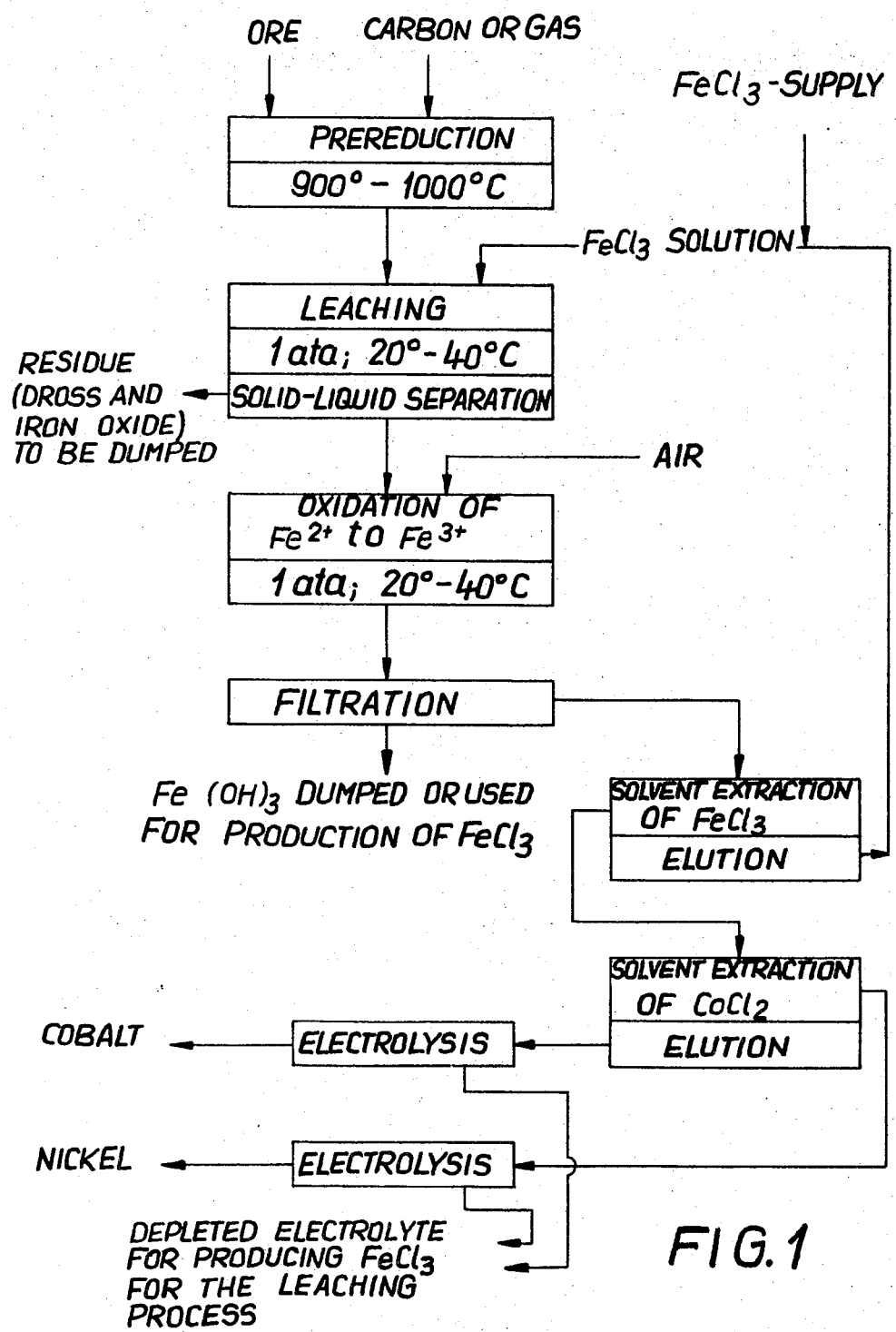
FIG. 1 describes processing of a lateritic ore which contains cobalt and nickel, these valuable components being obtained by electrolysis after cleansing the raw solution.

With reference to FIG. 1, an oxidic nickel ore, containing, e.g., 1.5% Ni, 0.2% Co, 27% Fe, 0.9% Mn, 17% Mg, and 33% $SiO_2$ (all percentages being by weight and based on the total weight of the ore), is subjected to conventional, for example in a rotary furnace, prereduction at 900° to 1,000°C with from 10 to 15 percent by weight of coal, based on the weight of the ore and depending on the proportion of volatile components in the coal. The reduction is controlled in such a manner that nickel and cobalt in the ore are reduced to metal, whereas iron in oxide form therein is reduced only to ferrous iron.

Thus-prereduced material is then leached with an aqueous ferric chloride solution, and a 5 to 10 percent by weight excess of $FeCl_3$, with respect to the stoichiometric amount required for contained cobalt, manganese and nickel, is added after the resulting reaction. The leaching is effected at 20° to 30°C and is completed after about one hour with yields of the valuable substances of from 90 to 95 percent. The mole ratio of Fe/(Ni+Co+Mn) for which the solution is set is approximately 2.

The solution is then treated at ambient temperature with an oxidation agent, such as air, after solid/liquid separation. The following reaction takes place:

$$12 FeCl_2 + 3 O_2 + 6 H_2O \rightarrow 8 FeCl_3 + 4 Fe(OH)_3.$$

The resulting ferric hydroxide precipitate is separated and the solution, which now has a mole ratio for Fe/(Ni+Co+Mn) of 1.33, is subjected to a conventional process for separating the valuable substances, e.g., by solvent extraction.

One such solvent extraction serves to separate the valuable substances from the ferric chloride, the latter then being available for recirculation to the leaching operation.

A highly useful reagent for separating $FeCl_3$ from the solution containing valuable substances is N—dodecenyl—N—trialcylmethylamine which has long been used for the separation of $FeCl_3$ from pickling fluids. The $FeCl_3$ in the organic extracting agent is returned by reextraction with water to an aqueous phase that is reused in the leaching step.

After removal of the ferric chloride, the valuable substances, cobalt and nickel, remain. This admixture is subjected to solvent extraction to remove cobalt chloride therefrom. The extraction of cobalt from the solutions acidified with hydrochloric acid is effected with triisononylamine or tri-n-octylamine which selectively separate the cobalt. Nickel remains completely in the residual solution. Cobalt is reextracted from the organic phase with water.

The eluate containing such removed cobalt chloride is then subjected to conventional electrolysis to isolate cobalt therefrom; the remainder, containing any nickel values, is also subjected to conventional electrolysis to isolate nickel therefrom.

Each of the noted electrolyses is effected, e.g., is an aqueous hydrochloric acid solution. Any washed out ferric chloride is, e.g., recirculated for use in the leaching step. Depleted hydrochloric acid electrolyte is used, e.g., for producing ferric chloride for leaching. The process thus permits complete circulation of chlorine, losses of chlorine occurring merely in the filtration steps due to washing.

Figure 2:
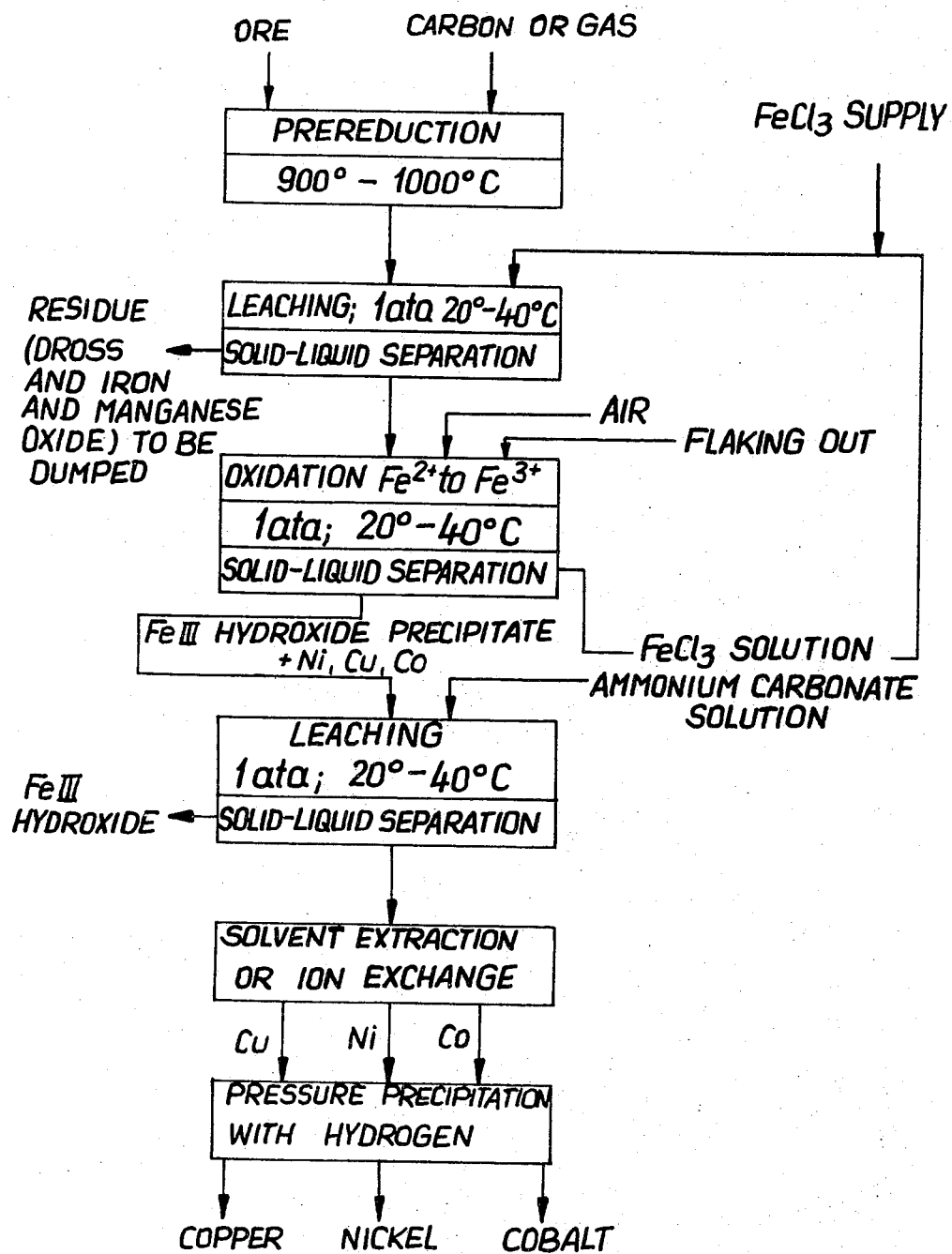
FIG. 2 describes processing of a lateritic ore containing copper, cobalt and nickel, these valuable components being extracted from precipitated ferric hydroxide on which they are adsorbed.

During oxidation of ferric chloride according to the process shown in FIG. 2, formation of ferric hydroxide precipitate is regulated by addition of flaking aids.

Polyelectrolytes, such as polyacrylamide, are used as flaking agents in amounts of 1 to 10 grams per liter of suspension (ferric hydroxide + solution).

So a major portion of any nickel, copper and cobalt ions present are adsorptively deposited on the hydroxide precipitate and are thus taken out of solution together therewith. These ions are obtained by selective extraction of the precipitate with aqueous ammonium carbonate, which forms soluble amino complexes with the valuable substances. Separation of valuable components from the ammonium carbonate solution is effected in a known manner by solvent extraction or ion exchange. Pressure precipitation with hydrogen then yields the isolated corresponding metal powders. Separation of the valuable metals by solvent extraction takes place in the following order: Copper, cobalt and nickel. The copper is extracted with benzophenonoxime (Lix 64 N, Lix 70), reextracted from the organic phase with sulphuric acid and precipitated by electrolysis or by reduction at a pH value of 9 with hydrogen at a pressure of 30 atmg. and a temperature of 150° C (1). Then cobalt and nickel are extracted from the copper-free solution with carboxylic acid (2) at a pH value of 6 and reextracted with a weakly acidified aqueous solution having a pH value of 5. After raising the pH value with an ammoniacal solution, most of the nickel is first precipitated as powder with hydrogen at a pressure of 35 atmg. and a temperature of 200° C. The remaining amount of nickel is removed by cementation with powdered cobalt. The cobalt in the nickel-free, cobalt-containing solution is removed as powder with hydrogen at a pressure of about 40 atmg. and a temperature of 200° C.

The solution (from the oxidation step), which still contains certain quantities of valuable substances even after ferric hydroxide precipitation, is recirculated to leach pre-reduced ore. With such recirculation of non-precipitated valuable substances, loss of valuable materials is precluded and recovery is greater than in the process according to FIG. 1.

It will be understood that the above description of the present invention is susceptible to various modification, changes and adaptations, and the same are intended to be comprehended within the meaning and range of equivalents of the appended claims.

We claim:

1. A process for isolating valuable substance selected from the group consisting of nickel, copper and cobalt from oxidic ore containing such values and which comprises reducing the ore so that these values, but not any iron contained in the ore, are reduced to their free metal state, leaching the valuable substance from thus-reduced ore at normal pressure and at a temperature below 100°C with aqueous ferric chloride and oxidizing resulting eluate to precipitate ferric hydroxide therefrom.

2. A process according to claim 1 which further comprises separating thus-precipitated ferric hydroxide from the oxidized eluate and isolating the valuable substance from the resulting solution.

3. A process according to claim 2 wherein the isolating comprises solvent extracting followed by electrolysis.

4. A process according to claim 3 wherein ferric chloride is obtained from the solvent extracting and is employed in the leaching.

5. A process according to claim 3 wherein the electrolyte is hydrochloric acid, the process further comprising reacting depleted hydrochloric acid electrolyte from the electrolysis with part of the ferric hydroxide precipitate to form ferric chloride and using thus-formed ferric chloride in the leaching.

6. A process according to claim 1 which comprises adding a flaking agent to the eluate, while oxidizing the latter, to bind ions of the valuable substance to precipitating ferric hydroxide.

7. A process according to claim 6 which further comprises dissolving in an aqueous ammonium carbonate solution the valuable substance bound to the precipitated ferric hydroxide.

8. A process according to claim 7 which further comprises isolating individual components of the valuable substance from the resulting ammonium carbonate solution.

* * * * *